United States Patent
Ho et al.

(10) Patent No.: US 7,843,177 B2
(45) Date of Patent: Nov. 30, 2010

(54) CONTROL CIRCUIT AND METHOD FOR MAINTAINING HIGH EFFICIENCY IN SWITCHING REGULATOR

(75) Inventors: Hsin-Hsin Ho, Taipei County (TW); Ke-Horng Chen, Taipei County (TW); Tzong-Honge Shieh, Hsinchu County (TW)

(73) Assignee: Elite Semiconductor Memory Technology Inc., Hsinchu (TW)

( * ) Notice: Subject to any disclaimer, the term of this patent is extended or adjusted under 35 U.S.C. 154(b) by 337 days.

(21) Appl. No.: 11/930,177

(22) Filed: Oct. 31, 2007

(65) Prior Publication Data
US 2009/0108823 A1 Apr. 30, 2009

(51) Int. Cl.
*G05F 1/652* (2006.01)
(52) U.S. Cl. .................. 323/222; 323/259
(58) Field of Classification Search .......... 323/222, 323/271–272, 282–290; 363/15, 95, 97
See application file for complete search history.

(56) References Cited

U.S. PATENT DOCUMENTS

| | | | |
|---|---|---|---|
| 5,742,151 A * | 4/1998 | Hwang | 323/222 |
| 6,166,527 A * | 12/2000 | Dwelley et al. | 323/222 |
| 6,404,251 B1 | 6/2002 | Dwelley et al. | |
| 6,788,033 B2 * | 9/2004 | Vinciarelli | 323/225 |
| 7,030,596 B1 * | 4/2006 | Salerno et al. | 323/282 |

* cited by examiner

*Primary Examiner*—Rajnikant B Patel
(74) *Attorney, Agent, or Firm*—Jianq Chyun IP Office

(57) ABSTRACT

A high efficiency control circuit for operating a switching regulator is provided. The switching regulator can regulate an output voltage no matter the input voltage is higher, lower, or close to the output voltage. The switching regulator has first, second, third and fourth switches. The control circuit can operate the switching regulator in buck mode, boost mode, or buck-boost mode. In a buck-boost mode, the control logic drives the four switches in an efficiency sequence for reducing energy consumption during the switch transition, on the other side, resistive loss owing to the energy transfer phase is also minimized. Furthermore, the invention is capable of control duty cycle limitation to fit the consideration of the linearity of the converter.

16 Claims, 10 Drawing Sheets

Mode 2:
DSWC is fixed 10%
DSWD is fixed 90%
Mode 3:
DSWA is fixed 90%
DSWB is fixed 10%
Buck-Boost Mode

US 7,843,177 B2

CONTROL CIRCUIT AND METHOD FOR MAINTAINING HIGH EFFICIENCY IN SWITCHING REGULATOR

BACKGROUND OF THE INVENTION

1. Field of Invention

This invention relates to a control circuit and a method for controlling buck-boost switching regulators for maintaining high efficiency under buck-boost mode.

2. Description of Related Art

A switching regulator provides a regulated output voltage Vout to a load from an unregulated input voltage (for example, the battery voltage) Vin. In general, regulators have three operation modes for system requirement, i.e. buck mode, boost mode, and buck-boost mode. FIG. 1 shows the definition of the three operation modes. In buck mode, Vin is higher than Vout. In boost mode, Vin is lower than Vout. In buck-boost mode, Vin is close to Vout.

FIG. 2 shows a prior cascaded buck-boost switching regulator. As the name implies, the regulated output voltage is achieved by cascading a buck converter with a boost converter. The regulator includes inductors L11 and L12, capacitor C11 and C12 and switches SWA, SWB, SWC and SWD. This regulator needs two PWM control loops to control four switches by control signals CTL_A~CTL_D. Therefore, more external components will be required and accordingly, the circuit complexity and cost will be high. Further, the physical size of capacitor C11 must be huge to store large amount of charge.

FIG. 3 shows another traditional 4-switches buck-boost regulator. The regulator includes inductor L3, capacitor C3, and switches SWA, SWB, SWC and SWD. It has two operation stages. During on time of the switching period, switches SWA and SWC are ON and the inductor current increases linearly due to the positive crossover voltage. At the end of on time, switches SWB and SWD turns ON, and the inductor current then decreases and delivers its energy to the load. That is to say, the switching sequence in traditional 4-switches buck-boost regulator follows patterns "AC→BD→AC→BD" and so on for energy balance.

The major drawback of the control method for the prior regulator in FIG. 3 is that it consumes higher switching and conduction losses. Because each of the four switches turns on and off once every cycle, the switching losses are twice as large as that in a buck or boost converter. Considering the conduction loss, the voltage gain in this type is expressed by Vout/Vin=D/(1−D) and the inductor current $I_L$ is expressed by Iout/(1−D), wherein D represents duty cycle and Iout represents the output current. When Vin is close to Vout, which means duty cycle is about equal to 50%, the average inductor current $I_L$ will be twice as the average output current. Therefore the conduction losses for 4-switches will be four times of a buck or low duty boost converter.

U.S. Pat. No. 6,166,527 discloses another control circuits and method for switching regulators. FIG. 4 shows the prior switching regulator 14 and the control circuit 20 thereof. The regulator 14 includes switches SWA, SWB, SWC and SWD, input capacitor 16, inductor 17 and output capacitor 18. Symbol "19" represents a load. Switches SWA, SWB, SWC and SWD are controlled by drive signals $V_A$, $V_B$, $V_C$, and $V_D$, respectively. Control circuit 20 includes resistors 21A and 21B, error amplifier 22, pulse width modulator 25, and logic circuitry 29. Pulse width modulator 25 includes signal generator 24, and comparators 27 and 28. VREF represents a reference voltage and is connected to the positive terminal of the error amplifier. Signals $V_U$, $V_X$, $V_V$, $V_Y$ are output signals generated from the signal generator 24. Signal $V_{Z1}$ and $V_{Z2}$ are output signals generated from the comparators 27 and 28, respectively.

FIG. 5 is a signal waveform for the circuitry of FIG. 4. FIG. 6 is a signal waveform for showing switch sequence at buck-boost mode for the circuitry of FIG. 4. In buck-boost mode for the circuitry of FIG. 4, the switching sequence is AD→BD→AD→AC→AD→BD→AD→AC→ . . . , wherein "AD" represents switches SWA and SWD are ON; and so on. In buck mode for the circuitry of FIG. 4, the switching sequence is AD→BD→AD→BD→AD→BD→ . . . . In boost mode for the circuitry of FIG. 4, the switching sequence is AD→AC→AD→AC→AD→AC→AC→ . . . .

FIG. 7a and FIG. 7b show the inductor current and the output current for the circuitry of FIG. 3 and that for the circuitry of FIG. 4, respectively. In energy storage phase, switches SWA and SWC turn on so energy is stored in the inductor. In energy transfer phase, switches SWB and SWD turn on so energy is transferred to the load. Besides, during the energy-storage phase, the output voltage Vout is disconnected from the inductor. Therefore it is clear that the longer the energy transfer phase is, the higher the conduction loss of switch will be.

As shown in FIG. 7a and FIG. 7b, the average inductor current is low in FIG. 7b because the period of the energy transfer phase is shorter in FIG. 7b than in FIG. 7a, hence the conduction losses improves.

It would, however, be desirable to provide a high efficiency buck-boost switching regulator control circuit and method that can regulate an output voltage that is higher, lower, or the same as the input voltage. It would also be desirable to provide a buck-boost switching regulator control circuit that conserves power by modulating duty cycles of switches. It also would be desirable to provide a buck-boost switching regulator that has lower average inductor current by comparison with the same output current.

SUMMARY OF THE INVENTION

The present invention is directed to provide a high efficiency switching regulator that can maintain a constant output voltage during line and load transition. In accordance with the present invention, a method of controlling a switching regulator provides less switch requirement and reduces the average inductor current. Therefore it minimizes total power losses of the converter.

The invention provides a method for controlling a switching regulator circuit to supply a regulated output voltage in buck-boost mode, the switching regulator comprising an inductor, a first switch coupled between an input voltage and a first terminal of the inductor, a second switch coupled between the first terminal of the inductor and GROUND, a third switch coupled between a second terminal of the inductor and GROUND, and a fourth switch coupled between the second terminal of the inductor and the regulated output voltage. The method comprising: turning on the first and third switch, and turning off the second and fourth switch; turning off the third switch and turning on the fourth switch; turning off the first switch and turning on the second switch; and repeating above steps to adjust the regulated output voltage.

The invention still provides a control circuit for controlling a switching regulator circuit for supplying a regulated output voltage, the switching regulator comprising an inductor, a first switch coupled between an input voltage and a first terminal of the inductor, a second switch coupled between GROUND and the first terminal of the inductor, a third switch coupled between a second terminal of the inductor and GROUND, and a fourth switch coupled to the second terminal of the inductor and the regulated output voltage, the control circuit comprising: an error amplifier, comparing a feedback signal with a reference voltage to produce an output voltage, the feedback signal being proportional to the regulated output voltage; a waveform generator, for providing first and second periodic waveform signals; a first comparator, comparing the output voltage of the error-amplifier with the first periodic waveform signal to generate a first control signal; a second comparator, comparing the output voltage of the error-amplifier with the second periodic waveform signal to generate a second control signal; a clock generator, for generating a first clock signal; a frequency divider, for dividing frequency of the first clock signal to provide a second clock signal; and a control logic, in response to the first control signal, the second control signal, the first and the second clock, for providing first, second, third and fourth drive signals for respectively controlling duty cycles of the first, second, third, and fourth switches.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
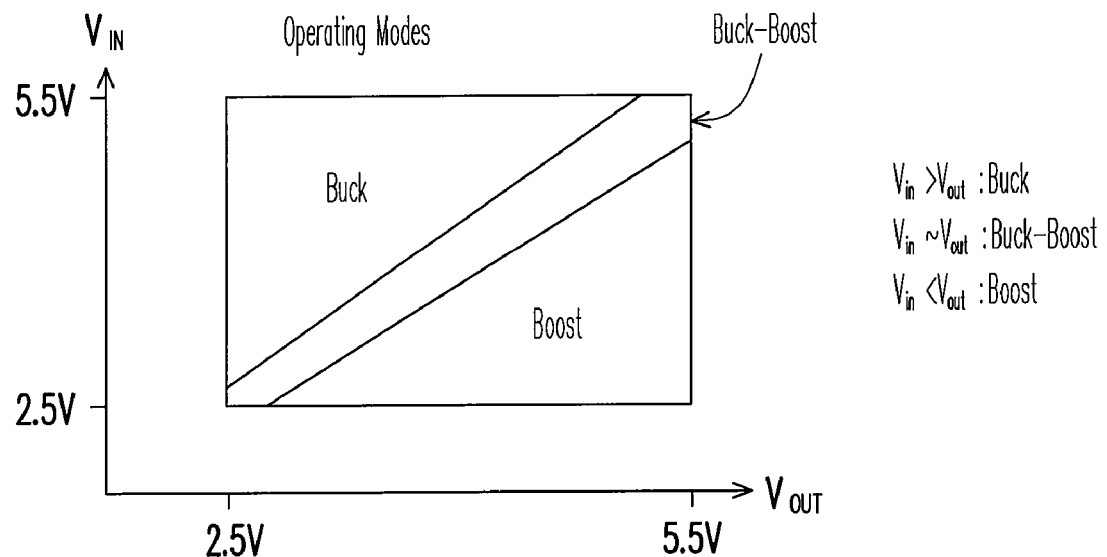
FIG. 1 shows the definition of the buck mode, boost mode, and buck-boost mode in prior art.
Figure 2:
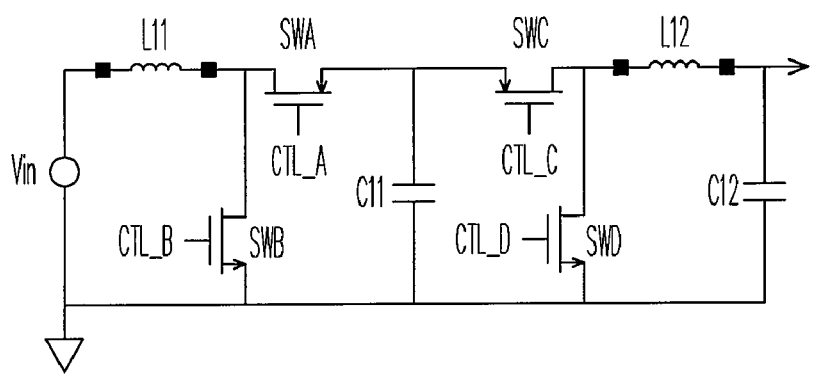
FIG. 2 shows a prior art cascaded buck-boost switching regulator.
Figure 3:
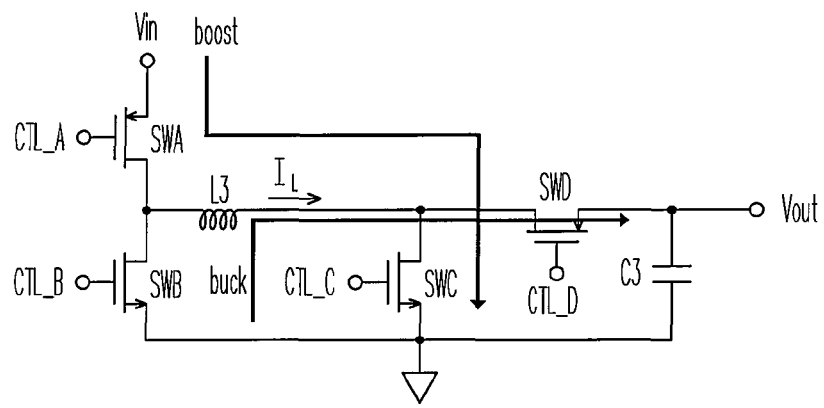
FIG. 3 shows another traditional 4-switches buck-boost regulator.
Figure 4:
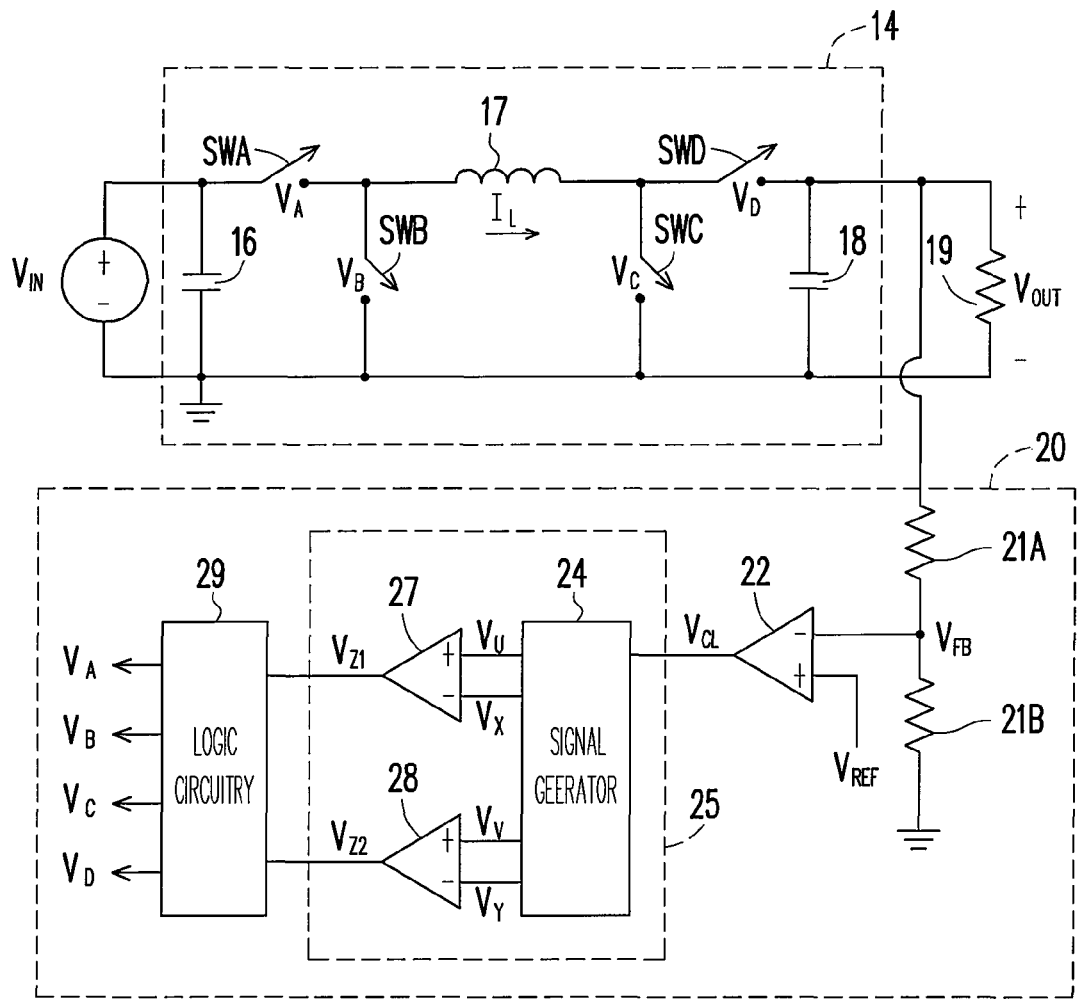
FIG. 4 shows a switching regulator 14 and a control circuit 20 disclosed in U.S. Pat. No. 6,166,527.

Reference will now be made in detail to the present embodiments of the invention, examples of which are illustrated in the accompanying drawings. Wherever possible, the same reference numbers are used in the drawings and the description to refer to the same or like parts.

In an embodiment according to the invention, high efficiency control circuit and method for operating a switching regulator are provided. The switching regulator can regulate an output voltage higher, lower, or close to the input voltage. The switching regulator may be synchronous or non-synchronous. The control circuit can operate the switching regulator in buck mode (MODE 1), boost mode (MODE 4), or buck-boost mode (MODE 2 OR MODE 3). In mode 1, the switching regulator regulates an output voltage that is less than the input voltage. In mode 4, the switching regulator regulates an output voltage that is greater than the input voltage. In mode 2 or mode 3, the switching regulator regulates the output voltage to a value that is greater than, less than, or equal to the input voltage.

Figure 8:
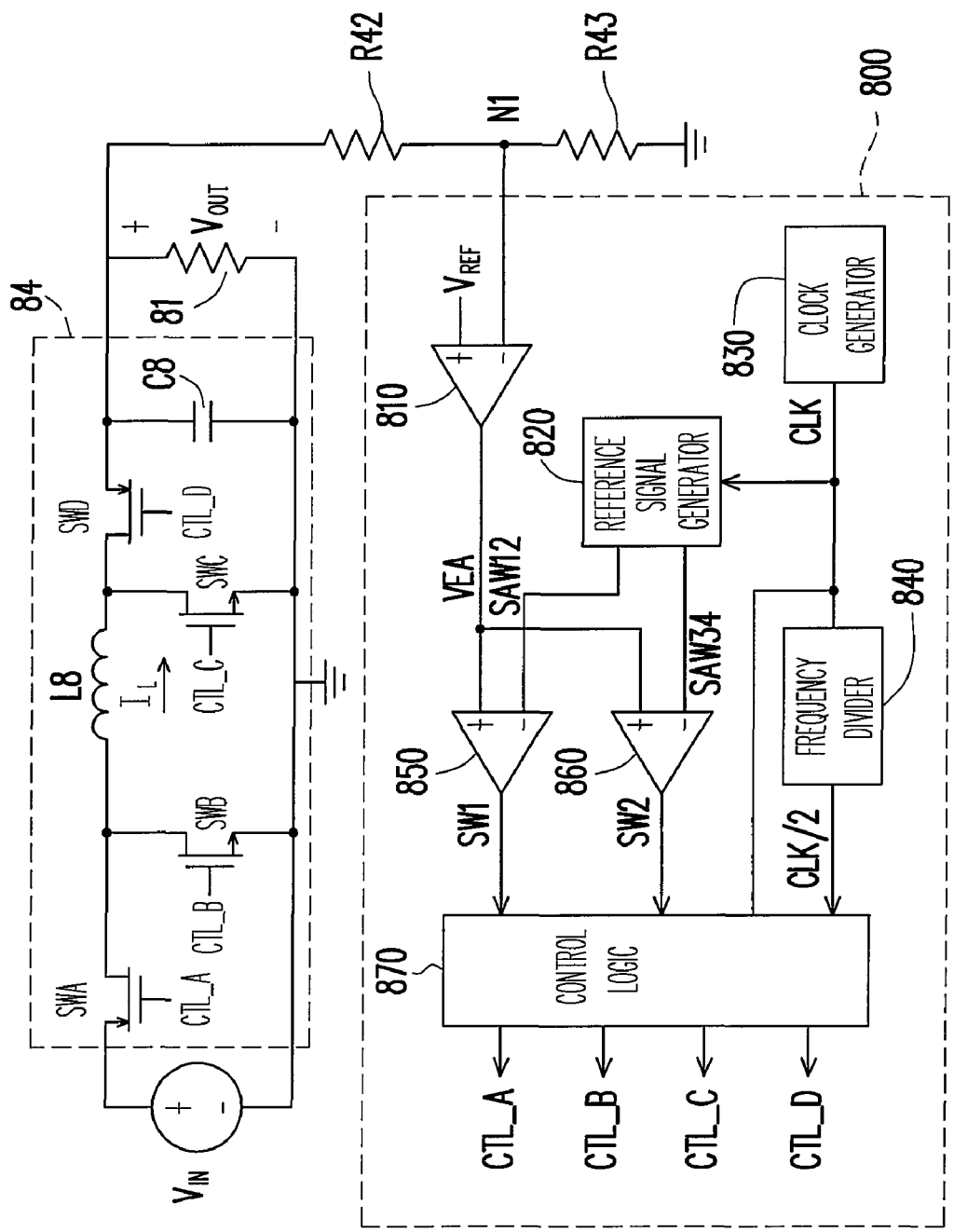
FIG. 8 shows a control circuit in accordance with the embodiment of the present invention.
Figure 9:
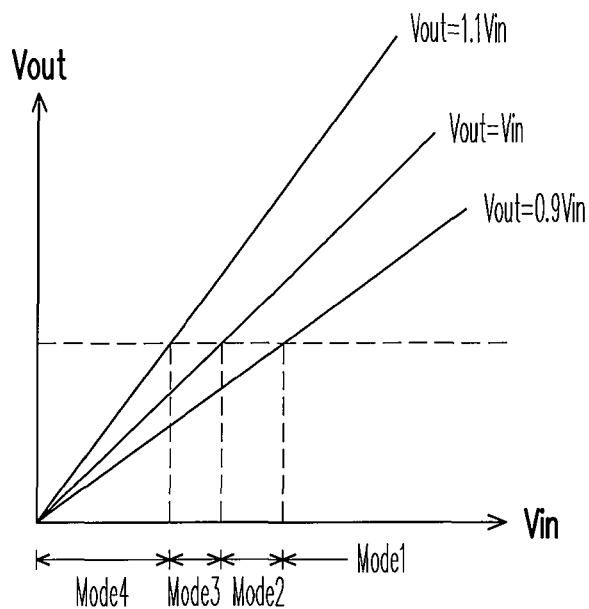
FIG. 9 shows definition of mode 1~mode 4 in accordance with the embodiment of the present invention.

Referring to FIG. 8, a control circuit in accordance with the embodiment of the present invention is shown. Synchronous switching regulator 84 receives input voltage Vin and provides regulated output voltage Vout to a load 81. Input voltage Vin may be higher, lower, or close to the output voltage Vout. Control circuit 800 may operate switching regulator 84 in mode 1, mode 2, mode 3, or mode 4. The definition of mode 1-mode 4 is shown in FIG. 9. When Vout is lower or equal to a first ratio (for example: 10%) of Vin, the switching regulator 84 is operated in mode 1. When Vout is higher than the first ratio of Vin but lower than Vin, the switching regulator 84 is operated in mode 2. When Vout is higher than Vin but lower than a second ratio (for example: 110%) of Vin, the switching regulator 84 is operated in mode 3. When Vout is higher than the second ratio of Vin, the switching regulator 84 is operated in mode 4. The first and second ratio depends on linearity of total circuit response, for example, the first ratio can be chosen as 0.9 and the second ratio can be 1.1, but the embodiment is not limited by.

Synchronous switching regulator 84 has four switches SWA, SWB, SWC and SWD coupled between Vin and Vout. The feedback mechanism regulates the output voltage Vout at desired value by adjusting each duty cycle of switches. Control circuit 800 receives output voltage Vout and provides four driving signals CTL_A, CTL_B, CTL_C and CTL_D that control the switching of the four switches (SWA, SWB, SWC, and SWD) in synchronous switching regulator 84.

The regulator 84 includes switches SWA, SWB, SWC and SWD, inductor L8 and output capacitor C8. Symbol "81" represents a load. Switches SWA, SWB, SWC and SWD are controlled by signals CTL_A, CTL_B, CTL_C and CTL_D, respectively. Control circuit 800 includes resistors R42 and R43, error amplifier 810, reference signal generator 820, clock generator 830, frequency divider 840, comparators 850 and 860, and logic circuitry 870.

In buck mode (mode 1) for the circuitry of FIG. 8, the switching sequence for power switches is AD→BD→AD→BD→AD→BD . . . , wherein the term "AD" means the switches SWA and SWD are both turned ON, and so on. In buck mode, the regulator 84 provides output voltage Vout that is lower than input voltage Vin, and control circuit 800 turns switches SWA and SWB ON and OFF at the regulator's switching frequency while keeping switch SWD always ON and switch SWC always OFF.

In boost mode (mode 4) for the circuitry of FIG. 8, the switching sequence is AD→AC→AD→AC→AD→AC→ . . . . In boost mode, the regulator 84 provides output voltage Vout that is greater than input voltage Vin, and control circuit 800 turns switches SWC and SWD ON and OFF at the regulator's switching frequency while keeping switch SWA always ON and switch SWB always OFF.

In buck-boost mode (mode 2 or mode 3), the regulator 84 provides output voltage Vout that is close to the input voltage Vin but may be less than or greater than the input voltage Vin. The switching sequence for switches in mode 2 or mode 3 is AC→AD→AD→BD→AC→AD→AD→BD . . . . The switching pattern "AC→AD" is the switching sequence of the boost converter and it aids the addition of the output voltage. On the other hand, the switching pattern "AD→BD" is the switching sequence of the buck converter and it aids the reduction of the output voltage. Consequently, the output voltage can be adjusted higher or lower than input voltage with the combination of buck and boost cycles.

Referring again to FIG. 8, the resistors R42 and R43 form a resistor divider between Vout and GROUND, and the midpoint between them is connected to an inverting input terminal of the error amplifier 810. A non-inverting input terminal of the error amplifier 810 is coupled to the reference voltage VREF and an output terminal of the error amplifier 810 is connected to the comparators 850 and 860. The comparator 850 has an inverting input coupled to the reference signal generator 820, a non-inverting input coupled to the error amplifier 810, and an output terminal coupled to the control logic 870. The comparator 860 has an inverting input coupled to the reference signal generator 820, a non-inverting input coupled to the error amplifier 810, and an output terminal coupled to the control logic 870. The control logic 870 provides four logic signals (CTL_A, CTL_B, CTL_C and CTL_D) for driving switches SWA, SWB, SWC, and SWD. The clock generator 830 generates a clock CLK for inputting to the reference signal generator 820, the control logic 870 and the frequency divider 840. The frequency divider 840 divides the clock CLK into another clock signal CLK/2 by two, which means the frequency of the clock CLK/2 is half of that of the clock CLK, and it aids to reduce the switching losses of the converter.

The resistors R42 and R43 form a voltage divider that produces a voltage feedback signal N1 proportional to the output voltage Vout. The error amplifier 810 amplifies the difference between VREF and N1 to produce a control voltage VEA. Control voltage VEA determines the duty cycle of the four switches SWA~SWD. VEA varies inversely with Vout, which may change in a short period during load or line transition. Thus, VEA is coupled to Vout indirectly through the error amplifier 810 and the voltage divider.

The reference signal generator 820 generates two periodic waveforms SAW12 and SAW34 at the same frequency. The reference signal generator 820 produces waveform signal SAW12, which is coupled to the comparator 850. The reference signal generator 820 also produces waveform signal SAW34, which is coupled to the comparator 860. The periodic waveforms may be triangular waveforms, or may be asymmetric sawtooth waveforms as shown, for example, in FIG. 13.

Referring again to FIG. 8, the comparator 850 compares the signal SAW12 with the control voltage VEA to generate control signal SW1 which decides on time of switches SWA and SWB. The comparator 860 compares signals SAW34 and VEA to generate control signal SW2 which decides on time of switches SWC and SWD.

Figure 13:
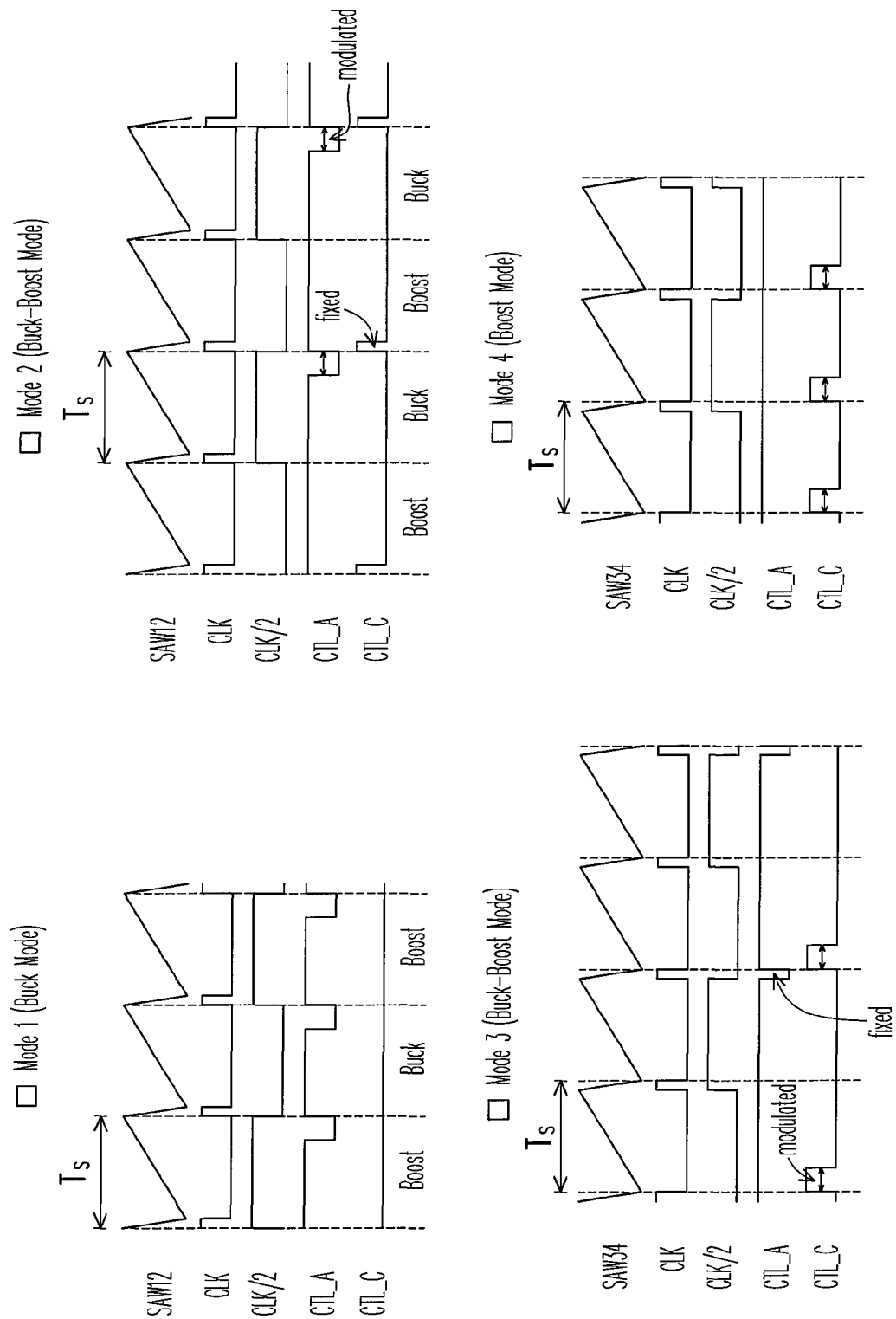
FIG. 13 shows waveforms in mode 1~mode 4 of the embodiment.

As shown in FIG. 13, signal SAW12 and SAW34 are sawtooth waveforms that both have the same period Ts. Besides, waveforms SAW12 and SAW34 are synchronized in phase.

Logic circuitry 870 generates drive signals CTL_A, CTL_B, CTL_C and CTL_D. FIG. 13 illustrates examples of signals SAW12, SAW34 and control signals CTL_A and CTL_C. In this embodiment, the signal CTL_B may be for example, an inversion signal of the signal CTL_A; and the signal CTL_D may be for example, an inversion signal of the signal CTL_C. With respect to FIG. 13, the switch is ON when the signal is HIGH and OFF when the signal is LOW, for purposes of illustration. In the embodiment, CTL_A=SW1, CTL_B=$\overline{SW1}$, CTL_C=SW2, CTL_D=$\overline{SW2}$. Other relationships between the signals CTL_A, SW1, CTL_B, CTL_C, SW2 and CTL_D are also possible. For example, if the non-inverting input of the comparator 850 is coupled to SAW12 and the inverting input of comparator 850 is coupled to VEA, then CTL_B=SW1, CTL_A=$\overline{SW1}$. Furthermore, if the non-inverting input of the comparator 860 is coupled to SAW34 and the inverting input of the comparator 860 is coupled to VEA, then CTL_D=SW2, CTL_C=$\overline{SW2}$.

Referring again to FIG. 8, the control logic 870 includes drive circuitry (not shown) for driving switches SWA, SWB, SWC, and SWD ON and OFF. For example, when SW1 goes HIGH, the control logic 870 causes logic signal CTL_A to go HIGH and logic signal CTL_B to go LOW, turning ON switch SWA and turning OFF switch SWB. When SW1 goes LOW, the control logic 870 causes logic signal CTL_A to go LOW and logic signal CTL_B to go HIGH, turning OFF switch SWA and turning ON switch SWB. When SW2 goes HIGH, the control logic 870 causes logic signal CTL_C to go HIGH and logic signal CTL_D to go LOW, turning ON switch SWC and turning OFF switch SWD. When SW2 goes LOW, the control logic 870 causes CTL_C to go LOW and CTL_D to go HIGH, turning OFF switch SWC and turning ON switch SWD. Further, the control logic 870 prevents switches SWA and SWB from being ON at the same time, and prevents switches SWC and SWD from being ON at the same time. In the buck-boost mode, the logic signals CTL_A to CTL_D control switches SWA to SWD switching in sequence AC→AD→AD→BD→AC→AD→AD→BD . . . , and the duty cycle limitation of logic signals CTL_A to CTL_D is determined by the consideration of the linearity of the switching regulator.

Figure 10:
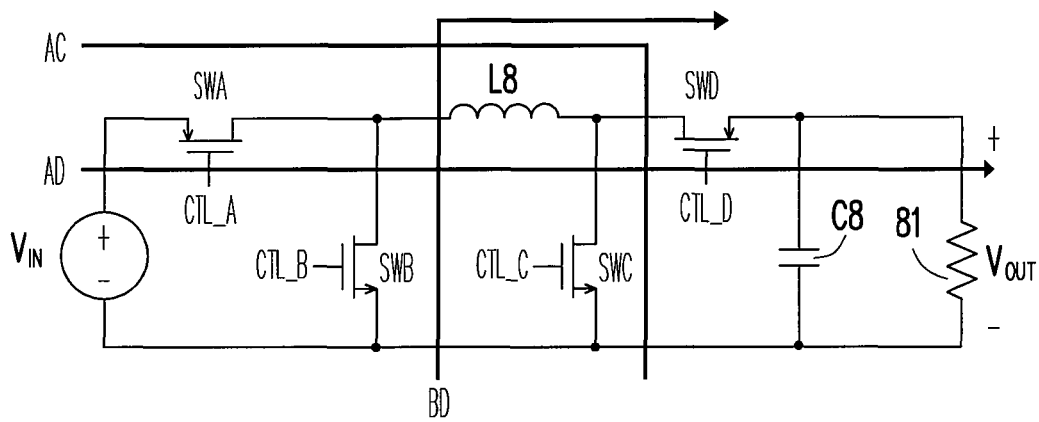
FIG. 10 shows current flow direction in mode 2 and mode 3 of the embodiment.

FIG. 10 shows current flow direction in mode 2 and mode 3 of the embodiment. The line AC shows the current flow caused by the ON switches SWA and SWC. The line AD shows the current flow caused by the ON switches SWA and SWD. The line BD shows the current flow caused by the ON switches SWB and SWD. DSWA, DSWB, DSWC and DSWD mean duty cycles of the switch SWA, SWB, SWC and SWD, respectively. In the embodiment, DSWC is fixed as 10% and DSWD is fixed as 90% at mode 2. In mode 3, DSWA is fixed as 90% and DSWB is fixed as 10%. Note that the fixed duty limitation may vary in different situation.

Figure 11:
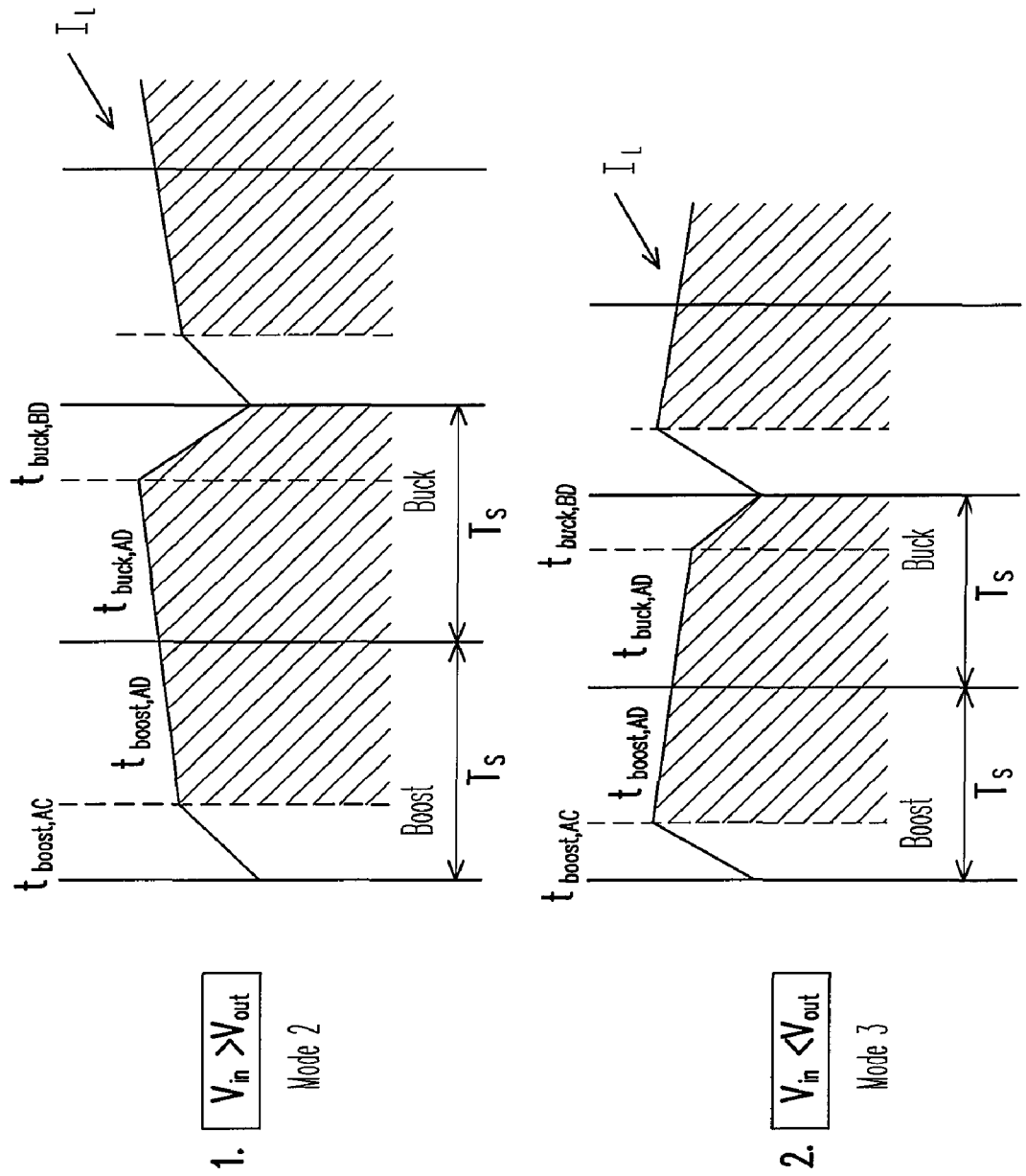
FIG. 11 shows the inductor $I_L$ flowing through the inductor L8 during mode 2 and mode 3 respectively.

FIG. 11 shows the inductor $I_L$ flowing through the inductor L8 during mode 2 and mode 3 respectively. When Vin>Vout, the regulator 84 operates in mode 2 (which is a buck-boost mode); and when Vin<Vout, the regulator 84 operates in mode 3 (which is a buck-boost mode). Note that the comparison of the input voltage and the full output voltage is not the only criterion for mode transformation. Also, in FIG. 11, the oblique-line region represents energy transfer phase and the clear region represents energy storage phase.

In FIG. 11, $t_{boost,\,AC}$ is the total amounts of time that switches SWA and SWC are ON together in one switch cycle when the output voltage Vout is boosted by the regulator 84. Similarly, $t_{boost,\,AD}$ is the total amounts of time that switches SWA and SWD are ON together in one switch cycle when the output voltage Vout is boosted by the regulator 84; $t_{buck,\,AD}$ is the total amounts of time that switches SWA and SWD are ON together in one switch cycle when the output voltage Vout is bucked by the regulator 84; and $t_{buck,\,BD}$ is the total amounts of time that switches SWB and SWD are ON together in one switch cycle when the output voltage Vout is bucked by the regulator 84. "Ts" is the period of one switching cycle.

In mode 2 and mode 3, the period of the energy storage phase is determined by $t_{boost, AD}$. As shown in FIG. 11, the energy storage phase is short, which means the conduction loss in mode 2 and mode 3 is low in the embodiment.

Figure 12:
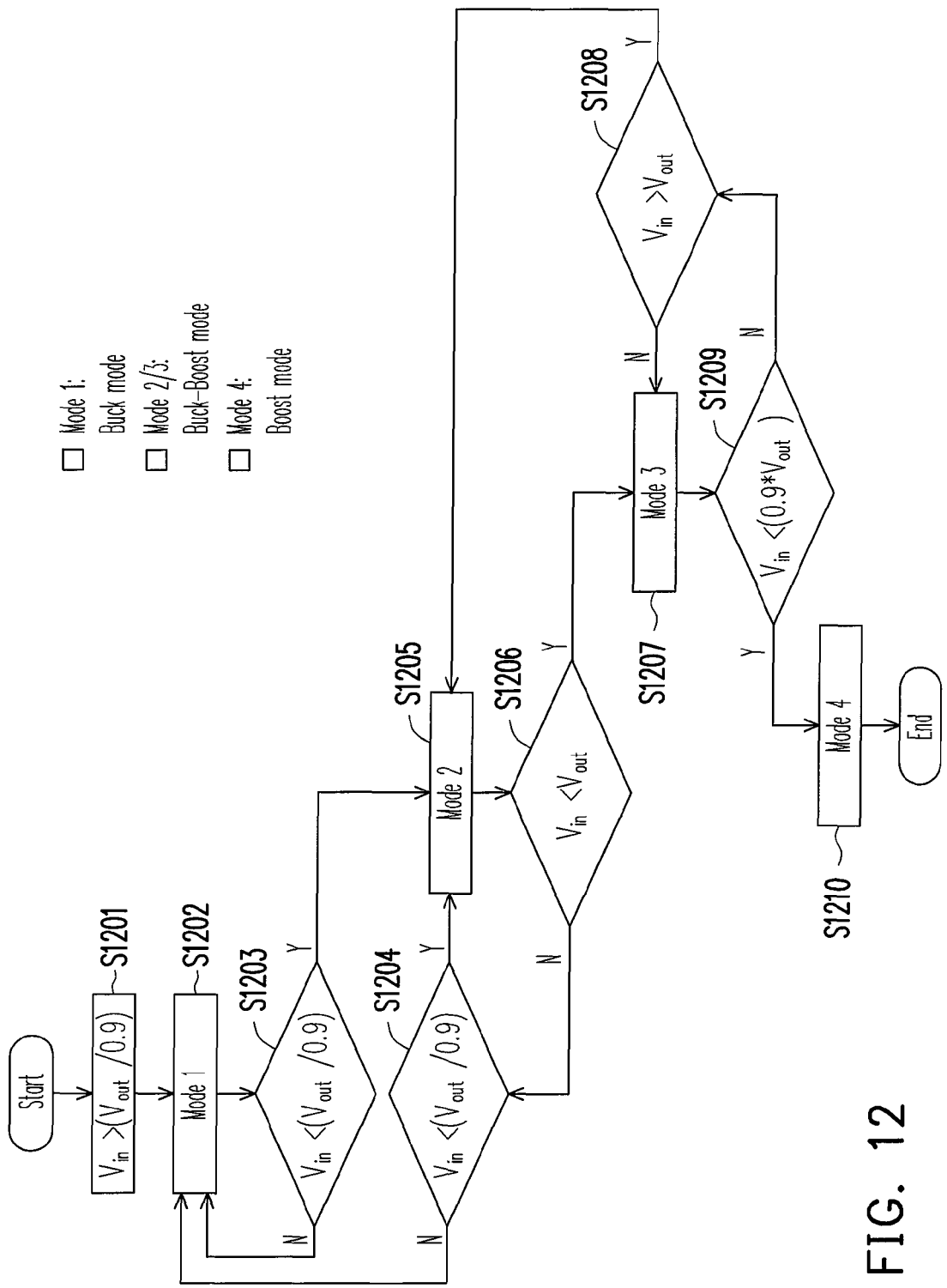
FIG. 12 shows a flow chart for determining the operation mode in the embodiment.

FIG. 12 shows a flow chart for determining the operation mode in the embodiment. In step S1201, in default setting, Vin is larger than (Vout/0.9). The regulator is operated in mode 1, as shown in step S1202. Then, in step S1203, it is determined whether Vin is lower than (Vout/0.9). If yes, the flow jumps to step S1205; or the flow jumps backs to step S1202. In step S1204, it is determined whether Vin is lower than (Vout/0.9). If yes, the flow jumps to step S1205; or the flow jumps backs to step S1202. In step S1205, the regulator is operated in mode 2. After step S1205, in step S1206, it is determined whether Vin is lower than Vout. If yes, the flow jumps to step S1207; or the flow jumps backs to step S1204. In step S1207, the regulator is operated in mode 3. Then, in step S1209, it is determined whether Vin is lower than (0.9*Vout). If yes, the flow jumps to step S1210; or the flow jumps backs to step S1208. In step S1208, it is determined whether Vin is higher than Vout. If yes, the flow jumps to step S1205; or the flow jumps backs to step S1207. In step S1210, the regulator is operated in mode 4. By this flow chart, the desired output voltage is regulated.

Now please refer to FIG. 13 which shows waveforms in mode 1~mode 4 of the embodiment. In mode 2, $t_{boost, AC}$ is fixed while $t_{buck, BD}$ is modulated according to the load and the input voltage. In mode 3, $t_{boost, AC}$ is modulated while $t_{buck, BD}$ is fixed.

As stated above, in the embodiment, none of the switches SWA~SWD will turn on more than 90% of the switching cycle Ts, and therefore, the linearity of the regulator gain is good.

Figure 5:
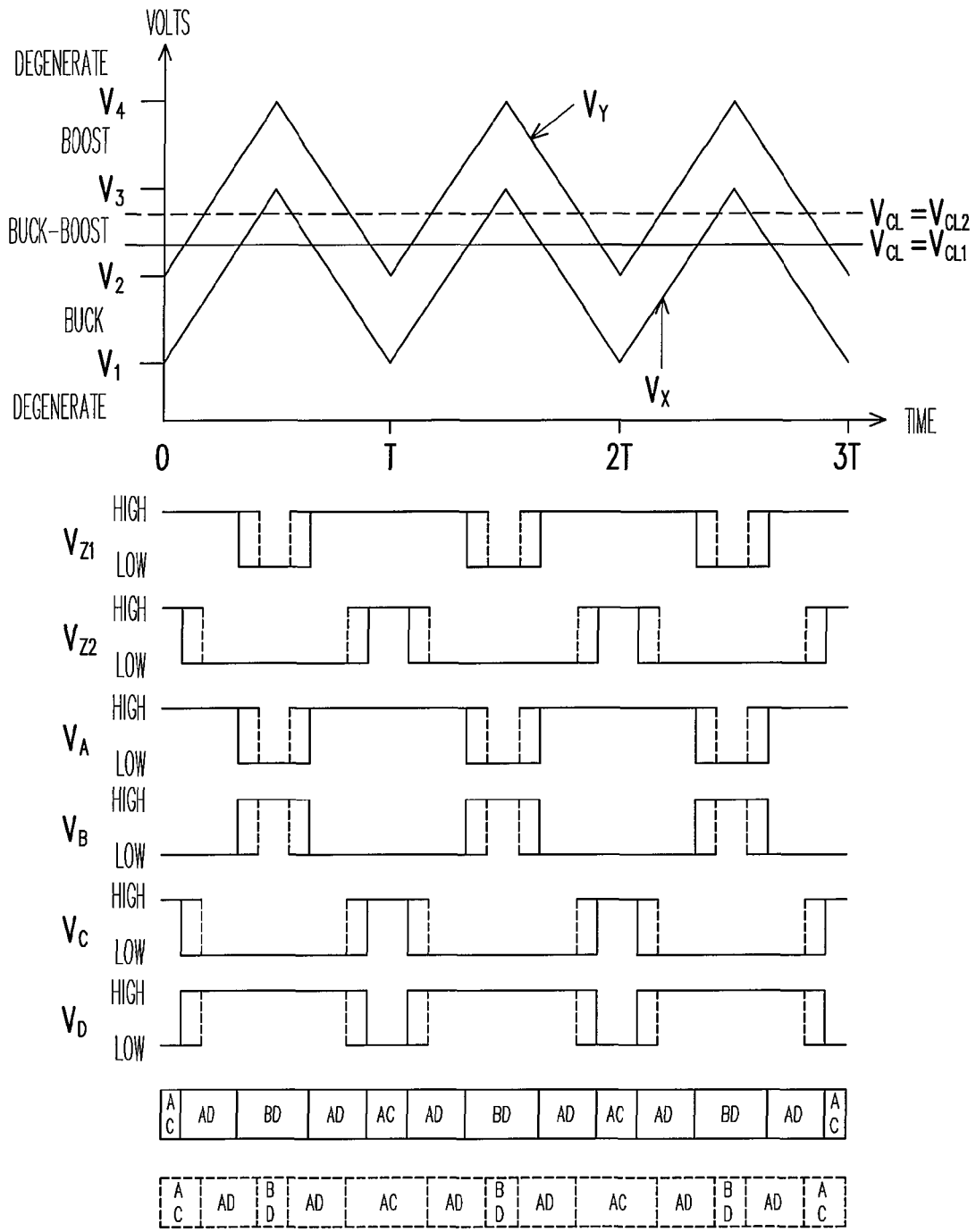
FIG. 5 is a signal waveform for the circuitry of FIG. 4.
Figure 6:
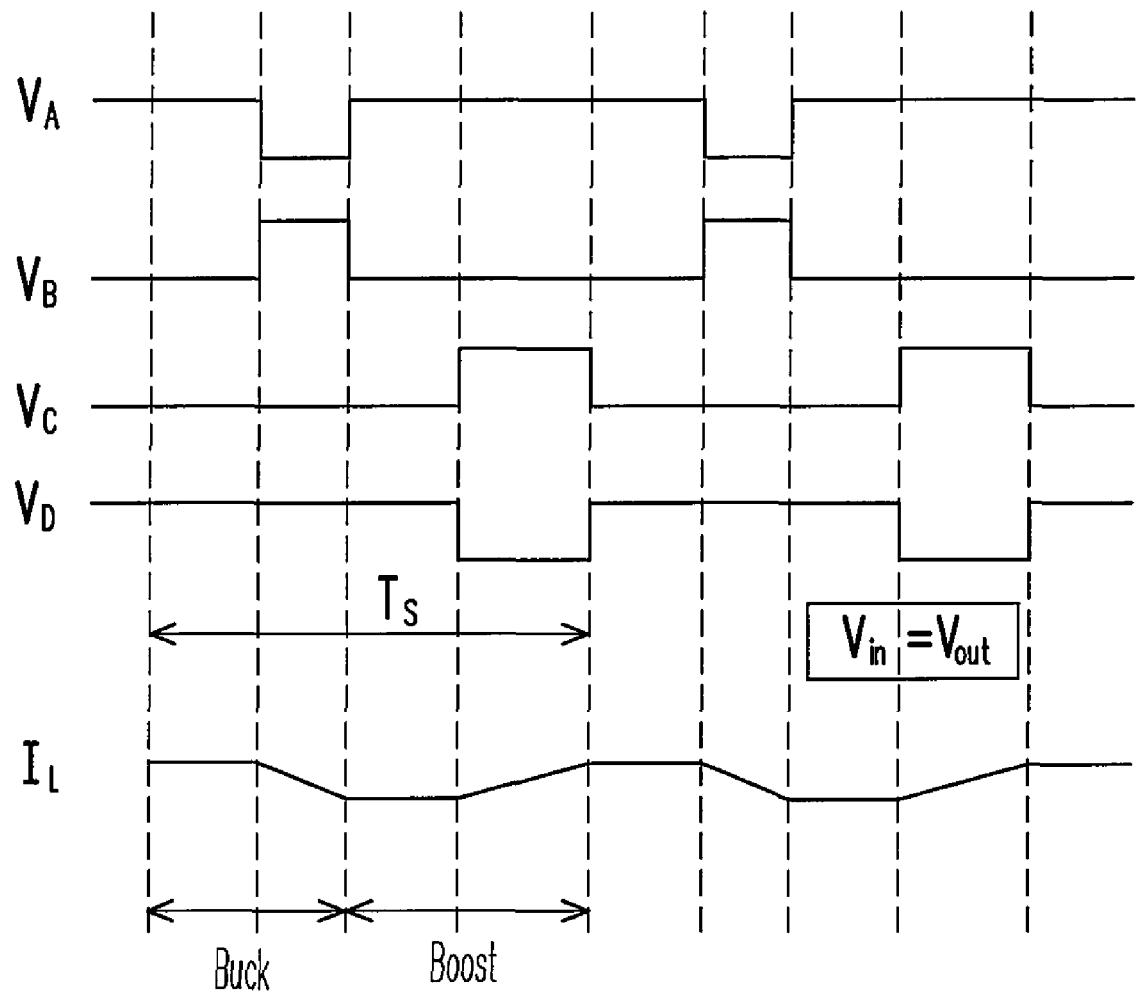
FIG. 6 is a signal waveform for showing switching sequence in buck-boost mode for the circuitry of FIG. 4.
Figures 7A, 7B:
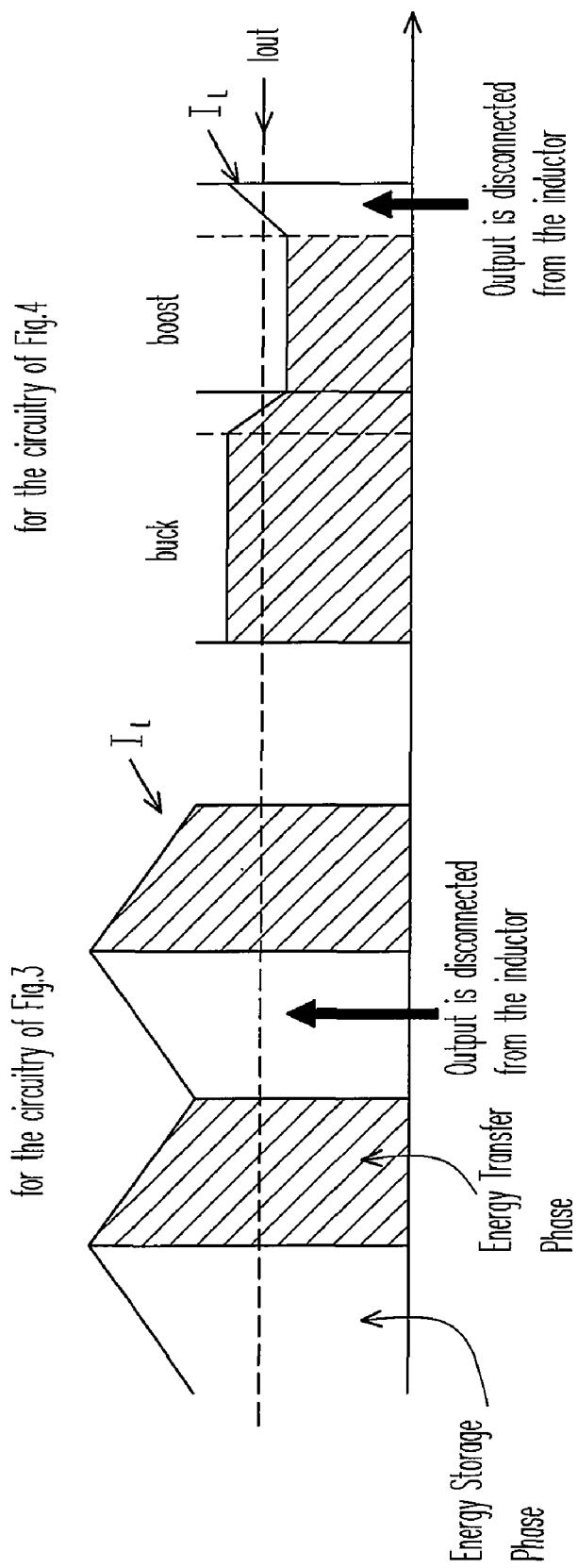
FIG. 7a and FIG. 7b show the inductor current and the output current for the circuitry of FIG. 3 and that for the circuitry of FIG. 4, respectively.

In U.S. Pat. No. 6,166,527 (FIG. 5), all the four switches will turn on and off once in one switching cycle T in the buck-boost mode. However, in the embodiment, only two switches will turn on and off once in one switching cycle in the buck-boost mode, which improves the efficiency of the regulator (i.e., in mode 2 and mode 3, during boost cycle, each of the switches SWC and SWD will be turned ON and OFF once in one switching cycle while during buck cycle, each of the switches SWA and SWB will be turned ON and OFF once in one switching cycle). Switching loss is also minimized in the embodiment because of low switching times.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for controlling a switching regulator circuit to supply a regulated output voltage, the switching regulator comprising an inductor, a first switch coupled between an input voltage and a first terminal of the inductor, a second switch coupled between the first terminal of the inductor and GROUND, a third switch coupled between a second terminal of the inductor and GROUND, and a fourth switch coupled between the second terminal of the inductor and the regulated output voltage, the method comprising:

making the switching regulator circuit enter a buck-boost mode by periodically switching the first through the fourth switches in accordance with the sequence of AC to AD to AD to BD, starting from said AC, so as to make only two switches among the first through the fourth switches turn on and off only once during a single switching cycle of the switching regulator to adjust the regulated output voltage, wherein said AC means the first and the third switches are both turned on, and the second and the fourth switches are both turned off, said AD means the first and the fourth switches are both turned on, and the second and the third switches are both turned off, and said BD means the second and the fourth switches are both turned on, and the first and the third switches are both turned off.

2. The method defined in claim 1 further comprising:
controlling the duty cycles of the first, the second, the third and the fourth switches to be not more than a predetermined ratio of one switching cycle of the switching regulator.

3. The method defined in claim 2 further comprising:
setting duty cycle limitation of the third and the fourth switches, wherein if duty cycle limitation of the third switch is D, then duty cycle limitation of the fourth switch is (1–D).

4. The method defined in claim 2 further comprising:
setting duty cycle limitation of the first and the second switches, wherein if duty cycle limitation of the second switch is D, then duty cycle limitation of the first switch is (1–D).

5. The method defined in claim 3 further comprising:
determining the duty cycle limitation D by the consideration of the linearity of the regulated output voltage.

6. The method defined in claim 4 further comprising:
determining the duty cycle limitation D by the consideration of the linearity of the regulated output voltage.

7. A control circuit for controlling a switching regulator circuit for supplying a regulated output voltage, the switching regulator comprising an inductor, a first switch coupled between an input voltage and a first terminal of the inductor, a second switch coupled between GROUND and the first terminal of the inductor, a third switch coupled between a second terminal of the inductor and GROUND, and a fourth switch coupled to the second terminal of the inductor and the regulated output voltage, the control circuit comprising:

an error amplifier, comparing a feedback signal with a reference voltage to produce an output voltage, the feedback signal being proportional to the regulated output voltage;

a waveform generator, for providing first and second periodic waveform signals;

a first comparator, comparing the output voltage of the error amplifier with the first periodic waveform signal to generate a first control signal;

a second comparator, comparing the output voltage of the error amplifier with the second periodic waveform signal to generate a second control signal;

a clock generator, for generating a first clock signal;

a frequency divider, for dividing frequency of the first clock signal to provide a second clock signal; and a control logic, in response to the first control signal, the second control signal, the first signal and the second clock signal, for providing first, second, third and fourth driving signals for respectively controlling duty cycles of the first, second, third, and fourth switches so as to make the switching regulator circuit enter a buck mode, a boost mode, or a buck-boost mode, wherein the control logic make the switching regulator circuit enter the buck-boost mode by periodically switching the first through the fourth switches in accordance with the sequence of AC to AD to AD to BD, starting from said AC, so as to make only two switches among the first through the fourth switches turn on and off only once during a single switching cycle of the switching regulator to adjust the regulated output voltage, said AC means the first and the third switches are both turned on, and the second and the fourth switches are both turned off, said AD means the first and the fourth switches are both turned on, and the second and the third switches are both turned off, and said BD means the second and the fourth switches are both turned on, and the first and the third switches are both turned off.

8. The control circuit defined in claim 7, wherein the waveform generator is a ramp generator, and the first and second periodic waveform signals are sawtooth signals.

9. The control circuit defined in claim 7, wherein the first and second periodic waveform signal are either at the same phase or at inverse phase.

10. The control circuit defined in claim 7, wherein the frequency divider substantially divides frequency of the first clock signal by 2.

11. The control circuit defined in claim 7, wherein the control logic controls the duty cycles of the first, the second, the third and the fourth switches to be not more than a predetermined ratio of one switching cycle of the switching regulator.

12. The control circuit defined in claim 11, wherein the control logic sets duty cycle limitation of the third and the fourth switches turning on and off, if duty cycle limitation of the third switch is D, then duty cycle limitation of the fourth switch is (1−D).

13. The control circuit defined in claim 11, wherein the control logic sets duty cycle limitation of the first and the second switches turning on and off, if duty cycle limitation of the second switch is D, then duty cycle limitation of the first switch is (1−D).

14. The control circuit defined in claim 12, wherein the control logic determines the duty cycle limitation D according to linearity of the regulated output voltage.

15. The control circuit defined in claim 13, wherein the control logic determines the duty cycle limitation D according to linearity of the regulated output voltage.

16. The control circuit defined in claim 7, further comprising:

a first resistor coupled between the regulated output voltage and the first input node of the error amplifier; and a second resistor coupled between the first input node of the error amplifier and ground.

\* \* \* \* \*